J. G. DUTSCHKE.
HOLDER FOR FRUIT JARS.
APPLICATION FILED OCT. 14, 1908.
925,315.
Patented June 15, 1909.
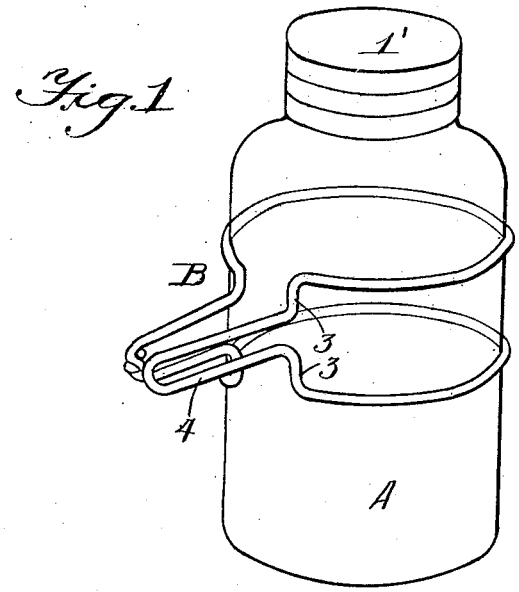
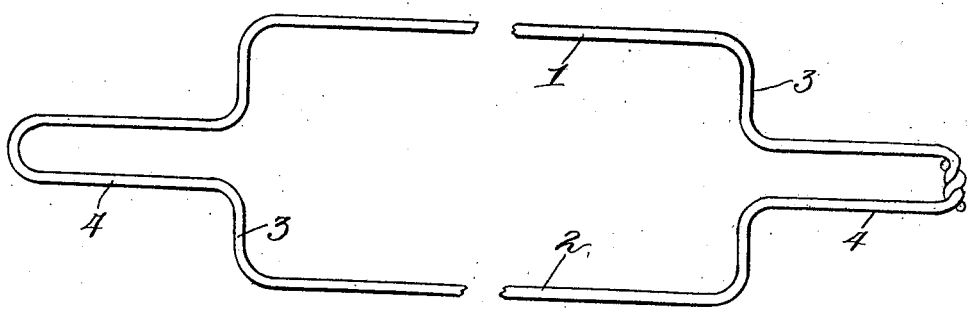
Witnesses
Addison W. Smith
C. Bradway
Inventor
James G. Dutschke.
By Victor J. Evans.
Attorney

UNITED STATES PATENT OFFICE.

JAMES G. DUTSCHKE, OF CECILIAN, KENTUCKY.

HOLDER FOR FRUIT-JARS.

No. 925,315.     Specification of Letters Patent.     Patented June 15, 1909.

Application filed October 14, 1908. Serial No. 457,718.

*To all whom it may concern:*

Be it known that I, JAMES G. DUTSCHKE, a citizen of the United States, residing at Cecilian, in the county of Hardin and State of Kentucky, have invented new and useful Improvements in Holders for Fruit-Jars, of which the following is a specification.

This invention relates to a jar holder for gripping the body of the jar while filling with hot fruit and during the placing and tightening of the top without danger of the hands being burned, and also for moving the jar while still hot.

The invention has for one of its objects to improve and simplify the construction of devices of this character so as to be comparatively simple and inexpensive to manufacture, and reliable and convenient in use.

Another object of the invention is the provision of a holder which consists of a pair of jar encircling bands which are spaced apart so as to grip the jar at remote points to thus distribute the strain on the glass when the jar is gripped by the holder and these bands are connected together at corresponding ends by handles which are compressed together to hold the bands engaged with the jar.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a perspective view of a glass fruit jar showing the holder applied. Fig. 2 is a plan view showing the holder spread open and intermediate portions of the bands broken away.

Similar reference characters are employed to designate corresponding parts throughout the several views.

Referring to the drawing, A designates a glass jar of any approved construction for preserving fruit or vegetables which is sealed by a cover 1' and applied to this jar is the holder designated generally by B. The holder is made of spring wire of suitable gage and is formed into two parallel bands 1 and 2 that are of such length as to almost entirely encircle the jar and are spaced apart a convenient distance so as to prevent the strain on the glass from being concentrated within a limited area. The corresponding ends of the bands are bent toward each other to form vertical portions 3 and doubled or U-shaped handles 4 project outwardly from the inner ends of these vertical portions 3.

In forming the holder, the various points thereof are so located that the ends or extremities of the wire are twisted together soldered or welded, at one of the handles.

The handles 4 are compressed together in order to grip the bands 1 and 2 around the jar and the bands are so shaped that they are normally spread open a sufficient distance to allow the holder to be easily and quickly placed over the jar. By grasping the handles in one hand and compressing the same toward each other, the jar can be firmly held while the top 1 is screwed in place, thereby preventing burning of the hands by gripping the jar directly or with a cloth, as is commonly necessary in placing the tops on the jars.

From the foregoing description, taken in connection with the accompanying drawing, the advantages of the construction and of the operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim is:—

A new article of manufacture, a jar holder formed of a single length of spring wire doubled upon itself and having the middle portions of the folded parts outwardly deflected and bent into circular form to provide jar-gripping members, and having the end portions of the folded parts spaced and extending parallel and connected at their outer extremities to provide handle members, and having the portions between the opposing ends of the handle members and the jar-gripping members straight and arranged about at a right angle to said member to obtain a definite bearing upon the jar when the holder is in use.

In testimony whereof I affix my signature in presence of two witnesses.

JAMES G. DUTSCHKE.

Witnesses:
ADDIE VERTREES,
LEIR CREAGER.